Patented Jan. 19, 1932

1,841,964

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Original application filed June 16, 1927, Serial No. 199,420, and in Germany July 21, 1926. Divided and this application filed July 28, 1928. Serial No. 296,087.

The subject matter of the present application has been divided out from our copending application for the manufacture of vat dyestuffs, Ser. No. 199,420, filed June 16, 1927, and relates to the manufacture of vat dyestuffs which are considered to be ms-anthradianthrones.

We have found that particularly valuable vat dyestuffs are obtained by subjecting allo-ms-naphthodianthrone or derivatives thereof obtainable according to our copending application Ser. No. 199,420 in acid solution to the action of oxidizing agents such as lead dioxid, manganese dioxid, nitric acid and the like. It is probable that by the said treatment condensation is effected with additional ring formation according to the formulae:

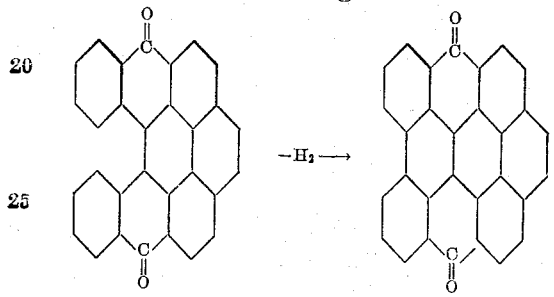

The new products may be termed ms-anthradianthrones. They generally dissolve in concentrated sulfuric acid to a violet to blue solution, and the bluish-violet vats give dyeings, on cotton, of similar shades which, when washed and soaped, change to a golden yellow extremely fast to light and chlorine.

Halogenated ms-anthradianthrones are obtained when treating halogenated allo-ms-naphthodianthrone in the above-described manner.

The following example will further illustrate the nature of the said invention which however is not restricted thereto. The parts are by weight.

Example 1 part of manganese dioxid is stirred, at ordinary temperature into the solution of 1 part of allo-ms-naphthodianthrone in 50 parts of concentrated sulfuric acid. Stirring is continued until the color of the solution has changed from green to a pure violet and after filtering by suction the filtrate is precipitated with ice. The resulting brown reaction product is identical with the dyestuff described in Example 1 of our copending application Ser. No. 296,088. It crystallizes from nitrobenzene in yellowish brown needles, dissolving to a violet solution in concentrated sulfuric acid, and dyes cotton from a bluish violet vat strong golden yellow shades.

The manganese dioxid may be replaced by lead dioxid, saltpetre, lead tetra-acetate or similar oxidizing agents.

What we claim is:—

1. The process of producing new vat dyestuffs which comprises subjecting an allo-ms-naphthodianthrone in acid solution to the action of an oxidizing agent.

2. The process of producing new vat dyestuffs which comprises subjecting a halogenated allo-ms-naphthodianthrone in acid solution to the action of an oxidizing agent.

3. The process of producing new vat dyestuffs which comprises subjecting an allo-ms-naphthodianthrone in sulfuric acid solution to the action of manganese dioxid.

4. As a new article of manufacture the vat dyestuff which is considered to be ms-anthradianthrone corresponding to the formula:

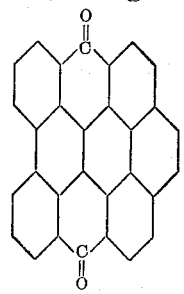

crystallizing from nitrobenzene in yellowish brown needles, dissolving to a violet solution in concentrated sulfuric acid and dyeing cotton from a bluish violet vat strong golden yellow shades.

In testimony whereof, we affix our signatures.

MAX ALBERT KUNZ.
KARL KÖBERLE.